United States Patent [19]

Kowalczyk

[11] Patent Number: 4,744,078
[45] Date of Patent: May 10, 1988

[54] MULTIPLE PATH MULTIPLEXED HOST TO NETWORK DATA COMMUNICATION SYSTEM

[75] Inventor: George P. Kowalczyk, Ft. Lauderdale, Fla.

[73] Assignee: Gould Inc., Rolling Meadows, Ill.

[21] Appl. No.: 733,173

[22] Filed: May 13, 1985

[51] Int. Cl.⁴ .......................... G06F 13/00; H04J 3/02
[52] U.S. Cl. ........................................ 370/85; 364/200
[58] Field of Search ... 364/200 MS File, 900 MS File; 370/85, 88

[56] References Cited

U.S. PATENT DOCUMENTS

| | | | |
|---|---|---|---|
| 3,643,236 | 2/1972 | Kolankowsky et al. | 365/230 |
| 4,047,157 | 9/1977 | Jenkins | 364/200 |
| 4,282,584 | 8/1981 | Brown et al. | 364/900 |
| 4,309,754 | 1/1982 | Dinwiddle, Jr. | 364/200 |
| 4,371,925 | 2/1983 | Carberry et al. | 364/200 |
| 4,443,846 | 4/1984 | Adcock | 364/200 |
| 4,493,033 | 1/1985 | Ziegler et al. | 364/200 |
| 4,584,679 | 4/1986 | Livingston | 370/94 |
| 4,597,078 | 6/1986 | Kempf | 370/88 |
| 4,604,683 | 8/1986 | Russ et al. | 364/200 |
| 4,622,630 | 11/1986 | Vora et al. | 364/134 |
| 4,635,192 | 1/1987 | Ceccon et al. | 364/200 |
| 4,700,340 | 10/1987 | Beranek | 370/60 |

OTHER PUBLICATIONS

Verebély, P., "GD80-A Multi-Microprocessor Architecture for Computer Graphics", Euromicro Journal, vol. 6, Nov. 1980, pp. 406–409.

Primary Examiner—Archie E. Williams, Jr.
Assistant Examiner—Eric Coleman
Attorney, Agent, or Firm—Edward E. Sachs; G. Paul Edgell; Robert J. Fox

[57] ABSTRACT

A data transfer controller allows data to be transferred from a network bus to a system bus in a host computer. The controller has a network bus interface for communicating with the network bus and a system bus interface for communicating with the system bus. The system bus interface has first and second buffers. A dual port memory is utilized and has one port operatively connected to one of the buffers in the system bus interface and to a microprocessor. The direct access channel is established and operatively connected to the other buffer of the system bus interface as well as coupled to the microprocessor and associated control logic. A switch under control of the control logic establishes connections between the second port of the dual port memory and either the direct access channel or the network bus interface.

5 Claims, 3 Drawing Sheets

4,744,078

MULTIPLE PATH MULTIPLEXED HOST TO NETWORK DATA COMMUNICATION SYSTEM

BACKGROUND OF THE INVENTION

The present invention relates in general to the field of data transfer controllers which link a host computer with a high speed network. In particular, the data transfer controller allows transfer of data between a network bus in the high speed network and a system bus in the host computer.

Prior art data transfer controllers, and in particular those utilized with local area networks, typically consist of a control microprocessor, a local memory, a direct memory access channel, a host computer interface logic and a dedicated network controller. An internal bus links the microprocessor and the local memory with the direct memory access channel and the interfaces. An access to the local bus is granted through an arbitration scheme as is well known in the art.

The disadvantage to such a method is mainly due to the fact that the bus is shared through multiple users, so effectively the microprocessor is allowed to use its resources only during a fraction of available time. The objectives for the microprocessor are to serve a host protocol, to report a status, to process data, or to perform communications functions above the level of physical access to the network. Because of limited time available to the microprocessor, the overall throughput is significantly low despite high performance levels of individual subunits which form the data transfer controller.

Several solutions have been proposed in the prior art to solve the problem of low throughput. Some of these solutions use a dual port memory connected to the network controller at one port and to the microprocessor and the direct memory access channel at the other port. Despite the additional hardware, the microprocessor is still suspended for a significant period of time in order to allow the direct memory access channel to operate on the local bus.

Another approach to increase the throughput in the prior art is based on the use of large first-in first-out memories installed on input and output ports to the network controller. This method is effective to increase a raw transfer rate of transparent data. The disadvantage to this method is that access to the data by the microprocessor is limited and thus the functionality of the data transfer controller as a whole is limited.

Therefore it is an object of the present invention to obtain high overall throughput combined with unlimited access to transferred data by the onboard microprocessor to overcome the disadvantages in the prior art. The present invention has the advantage of allowing the microprocessor to operate full time without waiting for other users of the resources within the data transfer controller. Since the microprocessor is usually the slowest part of the controller, this feature of the present invention has a direct impact on the overall performance of the controller.

SUMMARY OF THE INVENTION

The present invention involves a data transfer controller which allows data to be transferred from a network bus to a system bus in a host computer. The controller has a network bus interface for communicating with the network bus and a system bus interface for communicating with the system bus. The system bus interface has first and second buffers. A dual port memory is utilized and has one port operatively connected to one of the buffers in the system bus interface and to a microprocessor. The direct access channel is established and operatively connected to the other buffer of the system bus interface as well as coupled to the microprocessor and associated control logic. A switch under control of the control logic establishes connections between the second port of the dual port memory and either the direct access channel or the network bus interface.

BRIEF DESCRIPTION OF THE DRAWINGS

The features of the present invention which are believed to be novel are set forth with particularity in the appended claims. The invention together with further objects and advantages thereof, may best be understood by reference to the following description taken in conjunction with the accompanying drawings, in the several figures of which like reference numerals identify like elements, and in which:

DESCRIPTION OF A PREFERRED EMBODIMENT

The novel data transfer controller has high overall throughput for transferring data between a network bus and a system bus in a host computer with the advantage of unlimited access to the transferred data by an onboard microprocessor. The feature of the data transfer controller is the dual port memory, having one port connected to the onboard microprocessor and the other port switched between the network bus interface and a direct memory access channel.

Figure 1:
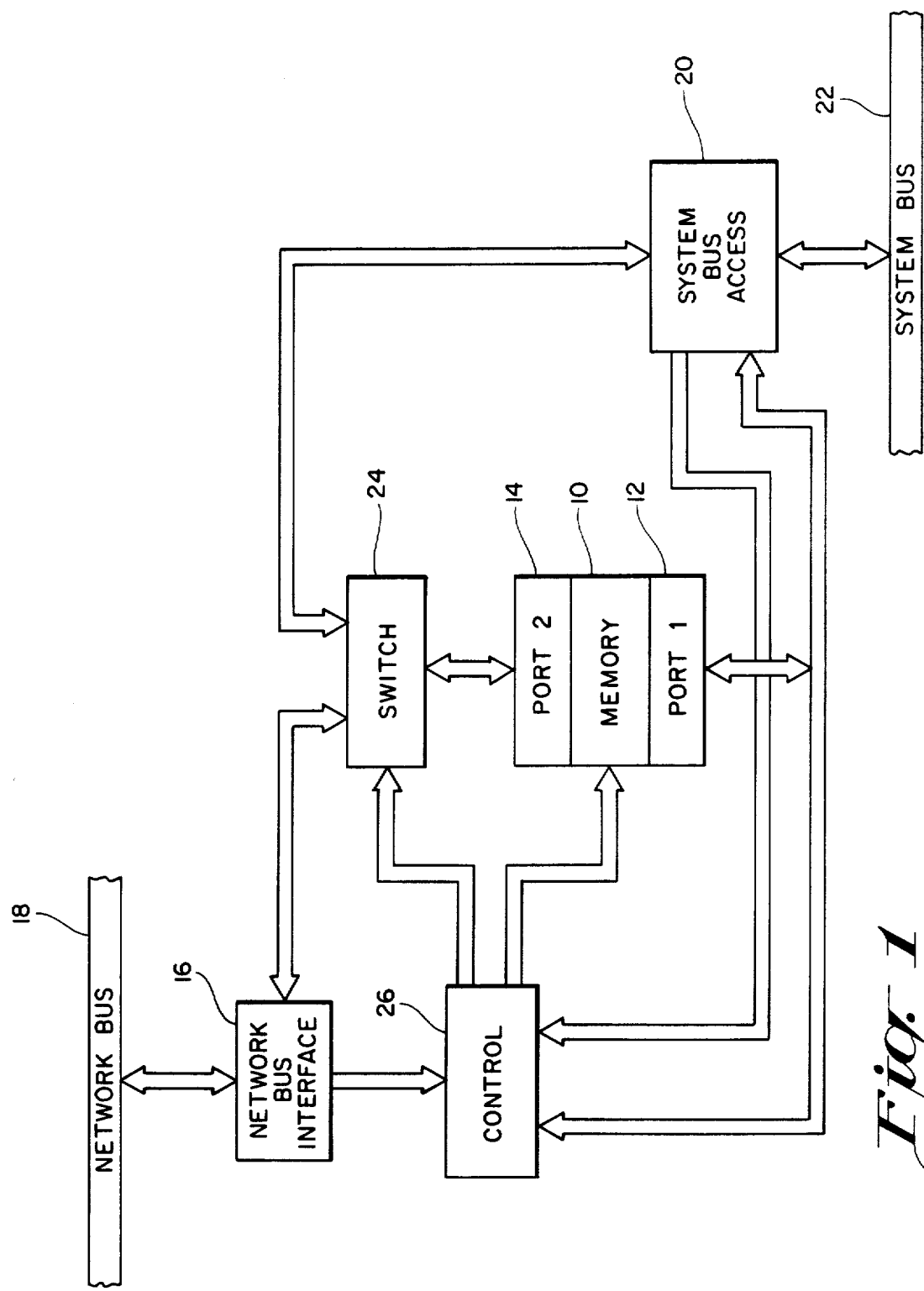
FIG. 1 is a general block diagram of the novel data transfer controller.

FIG. 1 is a general block diagram of the data transfer controller. A dual port memory 10 is utilized and has first and second ports 12 and 14. The dual port memory 10 may be a random access memory the operation of which is effected by address lines, write enable, data in/out and refresh capabilities. A network bus interface 16 establishes network protocol and data formating for interfacing with the network bus 18. The network bus interface 16 is capable of using preprogrammed instructions stored in the memory 10. The system bus access 20 establishes communication between the system bus 22 and the memory 10. The switch 24 connects either the network bus interface 16 or the system bus access 20 to memory 10. The control 26 provides the proper sequencing and logic for the portions of the data transfer controller discussed above.

Figure 2:
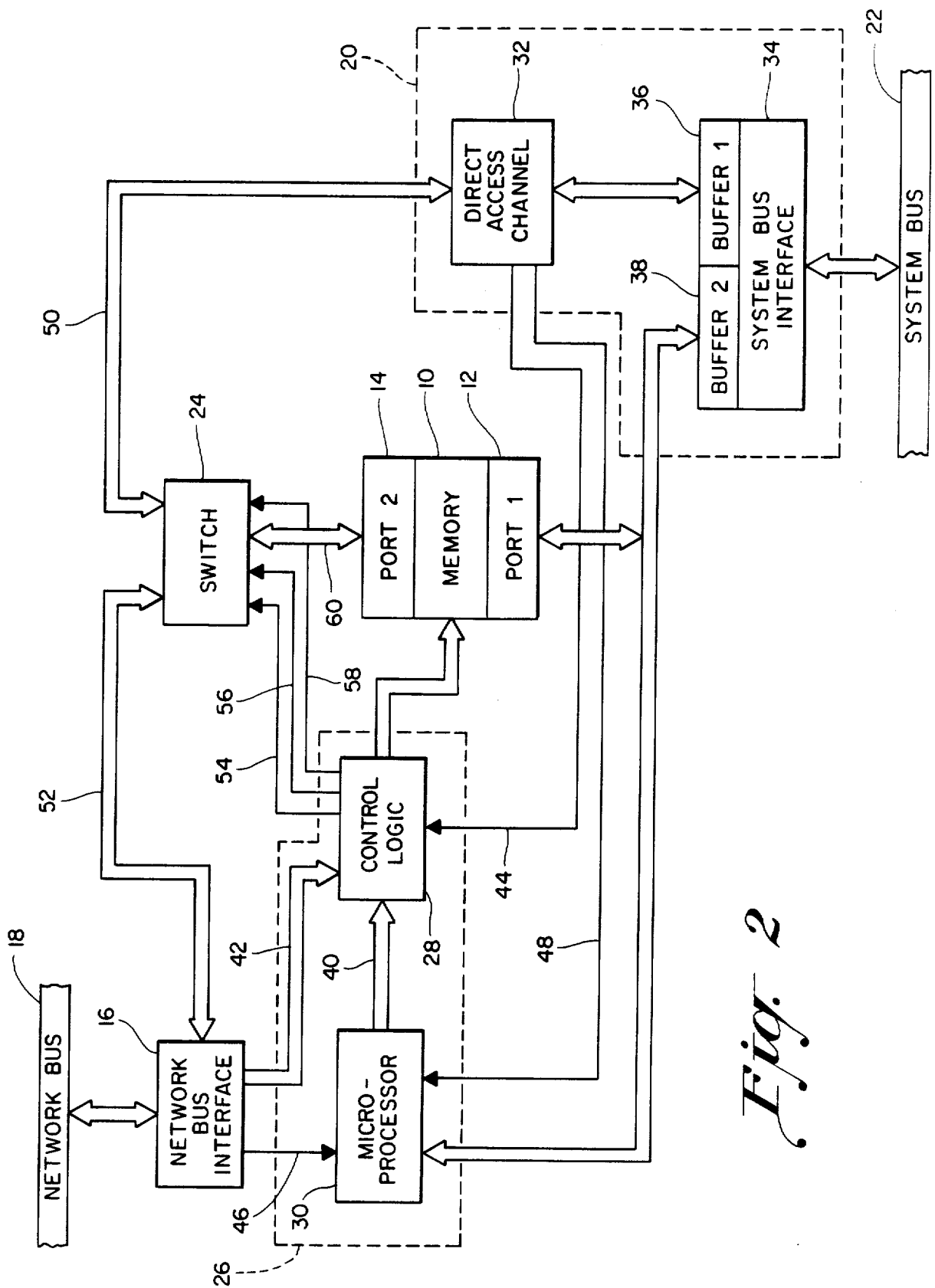
FIG. 2 is a more detailed block diagram of the FIG. 1 controller.

FIG. 2 is a more detailed block diagram of the FIG. 1 block diagram. As shown in FIG. 2, the control 26 of FIG. 1 comprises control logic 28 which is operatively connected to the dual port memory 10, the network bus interface 16, and the system bus access 20. The control logic 28 is also operatively connected to the switch 24. The control 26 further comprises the microprocessor 30. The microprocessor 30 is operatively connected to the network bus interface 16, the system bus access 20, the control logic 28, and the first port 12 of the dual port memory 10.

The system bus access 20 comprises a direct access channel 32 which handles defined amounts of data from and to defined locations in the memory 10 without intervention from other intelligent components. The direct access channel 32 is operatively connected to a system bus interface 34 which contains the logic for data and addresses to input and output buffers, bus control logic, bus arbitration logic, and interrupt logic for transferring data to the system bus 22. The system bus interface 34 transfers data and addresses on input and output and synchronizes them with the system bus clock on the system bus 22. It also generates interrupts and requests to the microprocessor 30 and to the direct access channel 32. It further maintains status and executes commands given to the logic contained in the system bus interface 34. The system bus interface 34 has a first buffer 36 operatively connected to the direct access channel 32 and a separate second buffer 38 operatively connected to the microprocessor 30, as well as, to the first port 12 of the memory 10. The first buffer 36 is used only for transferring data between the direct access channel 32 and the system bus 22 through the system bus interface 34. The second buffer 38 is used only for transferring I/O commands and effecting microprocessor 30 operation.

Inputs 40, 42 and 44 of the control logic 28 are connected to requesting outputs from the microprocessor 30, the network bus interface 16, and the direct access channel 32. Interrupt lines 46 and 48 from the network bus interface 16 and the direct access channel 32, respectively, connect to the microprocessor 30.

An address/data bus 50 operatively connects the direct access channel 32 to the switch 24 and address/data bus 52 operatively connects the network bus interface 16 to the switch 24. The control logic 28 is operatively connected to the switch 24 by control lines 54, 56, and 58. Also the switch 24 is operatively connected to the second port 14 of the memory 10 by line 60.

Figure 3:
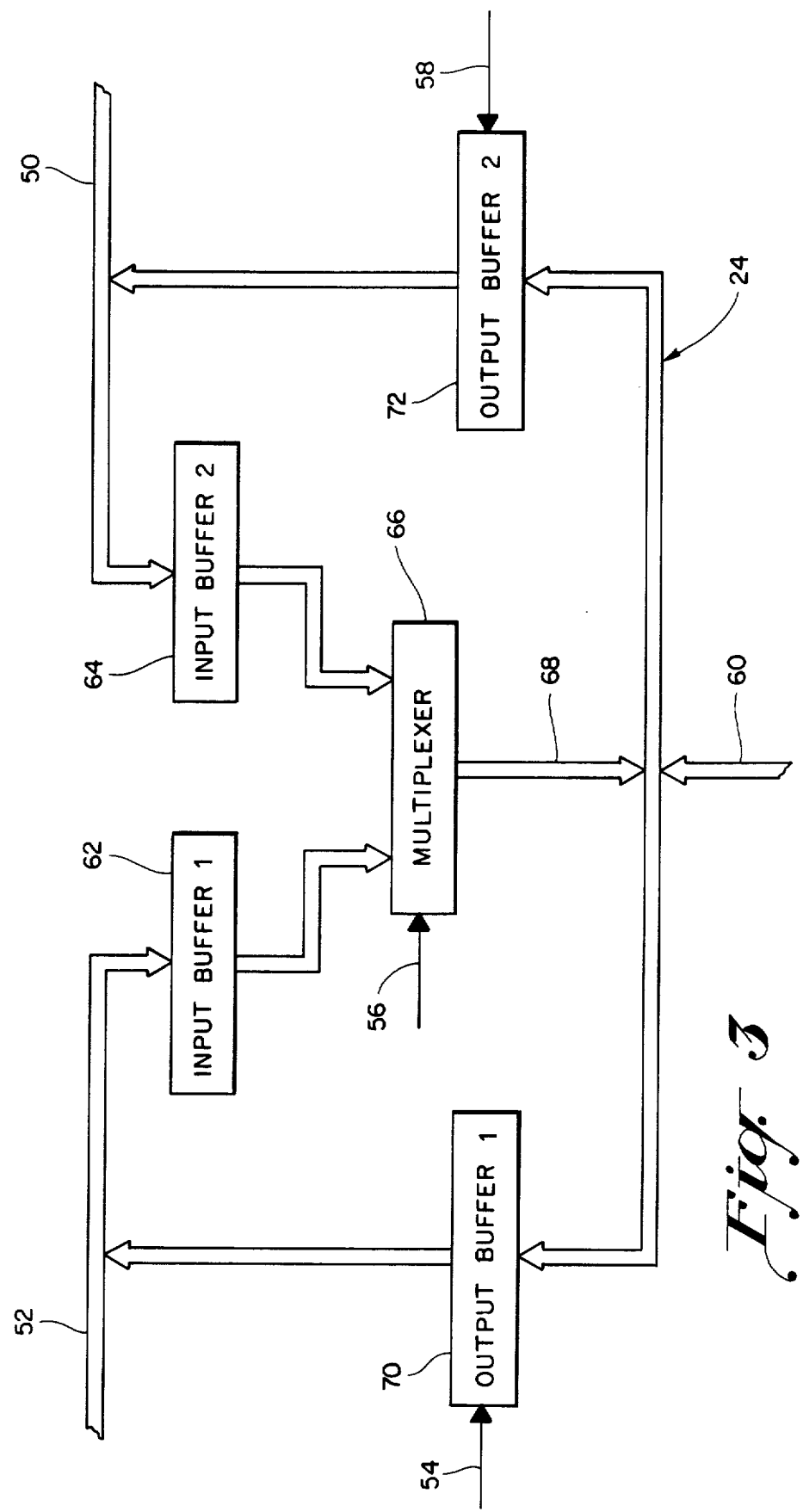
FIG. 3 is a block diagram of the switch identified in the FIG. 1 and 2 block diagrams.

FIG. 3 shows a more detailed block diagram of the switch 24. A first input buffer 62 is operatively connected to the bus 52 for receiving address and data information from the network bus interface 16. A second input buffer 64 is operatively connected to bus 50 for receiving data and address information from the direct access channel 32. Both the first and second input buffers 62 and 64 are operatively connected to a multiplexer 66 which is controlled by control line 56 from the control logic 28. An output of multiplexer 66 occurs on line 68 which is then operatively connected to the second port 14 of the memory 10 over line 60. First output buffer 70 is operatively connected between line 60 from the memory 10 to the bus 52 and therefore to the network bus interface 16. A second output buffer 72 is operatively connected between the line 60 from the memory 10 to the bus 50 and therefore to the direct access channel 32. Control lines 54 and 56 operate the first and second buffers 70 and 72, respectively, and are connected to the control logic 28. As determined by the control logic 28, the signal on line 56 causes the multiplexer 66 to choose between the appropriate first and second input buffers 62 and 64 for receiving data which is to be transmitted over line 60 to memory 10. When data is to be extracted from the memory 10 the control logic 28 using control lines 54 or 56 enable output buffers 70 and 72 to appropriately route the data or address information to the network bus interface 16 or the direct access channel 32.

In general after initialization of the data transfer controller, the controller is ready to transfer data from the system bus 22 to the network bus 18 or vice versa. When data is coming from the network bus 18, the network bus interface 16 recognizes the destination address in the data stream and stores a packet of data in the memory 10 through the port 14. The microprocessor 30 is signaled through the interrupt line 46 and starts to set the direct access channel 32 to transfer the packet onto the system bus 22. When the transfer is finished, the microprocessor 30 informs the host computer connected to the system bus 22 of the completion and fetches a request for new packet transfer. If there is a new packet coming from the network bus 18 when the direct access channel 32 is operating, the switch 24 arbitrates an access to the port 14 on a priority basis. The control logic 28 allows simultaneous access to the port 12 by sharing bus cycle time between ports 12 and 14. Output data from the memory 10 is lodged in buffers 70 and 72, serving the port 14 and in an appropriate latch in the port 12. After latching the output data, the control logic 28 switches the memory 10 to the next requesting user.

When transferring the data from the system bus 22 to the network bus 18, the microprocessor 30 sets the direct access channel 32 and then sets the network bus interface 16 to transfer data to the network bus 18. When all data is transferred through the system bus 22 to the memory 10, the microprocessor 30 fetches the next request from the computer host on the system bus 22 until the request list is complete. The computer host is informed about the status through the system bus 22.

The invention is not limited to the particular details of the apparatus depicted and other modifications and applications are contemplated. Certain other changes may be made in the abovedescribed apparatus without departing from the true spirit and scope of the invention herein involved. It is intended, therefore, that the subject matter in the above depiction shall be interpreted as illustrative and not in a limiting sense.

What is claimed is:

1. A host-to-network data communication system for transferring data between a system bus of a host computer and a network bus of a local area network, comprising: system bus means for coupling to a system bus of a host computer for exchange of digital data therewith; a system-multiplexer bus coupled to said system bus means for transfer of digital data to and from said system means; a multiplexer-switch coupled to said system-multiplexer bus for allowing said system-multiplexer bus to be selectively coupled to other portions of said communication system; network bus means for coupling to a network bus for exchange of digital information therebetween; a network-multiplexer bus coupled between said network bus means and said multiplexer-switch to carry digital data between said network bus means and said multiplexer-switch; a memory having a first port and a second port, said first port being connected to a memory-system bus, said second port being connected to a memory-multiplexer-switch bus, said memory transferring digital information from its first port through said system bus means to said system bus, said memory sending and receiving digital information through its second port via said multiplexer-switch either to and from said network bus means or to and from said system bus means; wherein said multiplexer-switch is configured to allow direct communication between said system bus means and said network bus means through said multiplexer switch, network bus means and said multiplexer-switch to carry digital data between said network bus means and said multiplexer switch.

2. A host-to-network data communication system for transferring data between a system bus of a host computer and a network bus of a local area network as defined in claim 1, wherein said multiplexer-switch includes a first input buffer connected between said system-multiplexer bus and said memory-system bus.

3. A host-to-network data communication system for transferring data between a system bus of a host computer and a network bus of a local area network as defined in claim 2, wherein said multiplexer-switch includes a second buffer connected between said network bus means and said memory-system bus.

4. A host-to-network data communication system for transferring data between a system bus of a host computer and a network bus of a local area network as defined in claim 3, wherein said multiplexer-switch has an output buffer connected between said system-multiplexer bus and said memory-system bus.

5. A host-to-network data communication system for transferring data between a system bus of a host computer and a network bus of a local area network as defined in claim 4, wherein said multiplexer-switch includes a second output buffer connected between said memory-system bus and said network-multiplexer bus.

* * * * *